(12) United States Patent
Barfoot (10) Patent No.: US 10,101,182 B2
(45) Date of Patent: Oct. 16, 2018

(54) INTERFEROMETRIC HIGH FIDELITY OPTICAL PHASE DEMODULATION USING 120 DEGREE PHASE SEPARATION

(71) Applicant: HALLIBURTON ENERGY SERVICES, INC., Houston, TX (US)

(72) Inventor: David A. Barfoot, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/116,500

(22) PCT Filed: Feb. 28, 2014

(86) PCT No.: PCT/US2014/019232
§ 371 (c)(1),
(2) Date: Aug. 3, 2016

(87) PCT Pub. No.: WO2015/130300
PCT Pub. Date: Sep. 3, 2015

(65) Prior Publication Data
US 2017/0010133 A1    Jan. 12, 2017

(51) Int. Cl.
*E21B 47/06* (2012.01)
*G01J 9/02* (2006.01)
*G01D 5/353* (2006.01)
*E21B 47/12* (2012.01)
*E21B 47/14* (2006.01)

(52) U.S. Cl.
CPC ......... *G01D 5/35306* (2013.01); *E21B 47/06* (2013.01); *E21B 47/065* (2013.01); *E21B 47/123* (2013.01); *E21B 47/14* (2013.01); *G01J 9/02* (2013.01); *G01J 2009/0226* (2013.01)

(58) Field of Classification Search
CPC ........ E21B 47/123; E21B 47/06; E21B 47/14; G01D 5/35306; G01J 9/02
USPC .......................... 250/227.14, 227.11, 227.18
See application file for complete search history.

(56) References Cited

U.S. PATENT DOCUMENTS 6,501,551 B1    12/2002 Tearney et al.
6,522,797 B1    2/2003 Siems et al.
(Continued)

FOREIGN PATENT DOCUMENTS

WO    2011/150242    12/2011
WO    2015/130300    9/2015

OTHER PUBLICATIONS

Optiphase, "TDI-7000 TDM Fiber Interrogator", A Halliburton Service, Aug. 6, 2013, Retrieved on Dec. 16, 2013 from website: http://www.optiphase.com/data_sheets/TDI-7000_Data_Sheet_Rev_E.pdf, 2 pgs.

(Continued)

*Primary Examiner* — Que T Le
(74) *Attorney, Agent, or Firm* — Gilliam IP PLLC (57) ABSTRACT

An illustrative interferometric system with high-fidelity optical phase demodulation includes a receiver having a fiberoptic coupler that produces optical interferometry signals having mutual phase separations of 120° and balanced photo-detectors that each produce an electrical difference signal based on a respective pair of said optical interferometry signals. The system further includes circuitry that converts the electrical difference signals into measurements of an interferometric phase.

23 Claims, 8 Drawing Sheets

(56) References Cited

U.S. PATENT DOCUMENTS

| | | | |
|---|---|---|---|
| 6,657,727 B1* | 12/2003 | Izatt | G01N 21/4795 356/450 |
| 7,274,441 B2 | 9/2007 | Payton | |
| 7,508,523 B2* | 3/2009 | Chang | G01N 21/4795 356/479 |
| 2008/0198367 A1 | 8/2008 | Chang et al. | |
| 2012/0067118 A1 | 3/2012 | Hartog et al. | |
| 2012/0162639 A1 | 6/2012 | Farhadiroushan et al. | |

OTHER PUBLICATIONS

Alazartech, "ATS9440 125 MS/s 4 Channel $OCI_E$ Digitizer", Retrieved on Dec. 16, 2013 from website: http://www.alazartech.com/products/ats9440.htm, 8 pgs.

Thorlabs, "PDB420C," Retrieved on Dec. 16, 2013 from website: http://www.thorlabs.com/thorproduct.cfm?partnumber=PDB420C, 1 pg.

Dandridge, A. et al., "Performance of 3×3 Couplers in Fiber Optic Sensor Systems", Proceedings of SPIE—The International Society for Optical Engineering, 10$^{th}$ Optical Fibre Sensors Conference, Sep. 1994, p. 549-552.

Mao, Youxin et al., "Sensitivity Investigation of Instantaneous Complex Conjugate Resolved Swept-Source OCT Using a Mach-Zehnder Interferometer with a 3×3 Fiber Coupler," Proc. of SPIE vol. 6796 6796F-1, 2007, 8 pgs.

Mao, Youxin et al., "3×3 MZI with Unbalanced Differential Detection for Full Range Swept-Source Optical Coherence Tomography," Proc. of SPIE vol. 7099 709909-1, 2008, 8 pgs.

Posey Jr., R. et al., "Strain Sensing Based on Coherent Rayleigh Scattering in an Optical Fibre," Electronic Letters, vol. 36, No. 20, Sep. 28, 2000, p. 1688-1689.

PCT International Search Report and Written Opinion, dated Nov. 5, 2014, Appl No. PCT/US2014/019232, "Interferometric High Fidelity Optical Phase Demodulation," Filed Feb. 28, 2014, 15 pgs.

"AU Patent Examination Report", dated Nov. 17, 2016, Appl No. 2014384702, "Interferometric High Fidelity Optical Phase Demodulation," Filed Feb. 28, 2014, 3 pgs.

"CA Examination Report", dated Apr. 26, 2017, Appl No. 2,934,458, "Interferometric High Fidelity Optical Phase Demodulation," Filed Feb. 28, 2014, 3 pgs.

Posey, Jr., et al., "Strain Sensing Based on Coherent Rayleigh Scattering in an Optical Fibre", Electronic Letters, vol. 36 No. 20, Sep. 28, 2000, pp. 1688-1689.

\* cited by examiner

INTERFEROMETRIC HIGH FIDELITY OPTICAL PHASE DEMODULATION USING 120 DEGREE PHASE SEPARATION

BACKGROUND

Fiber optic sensing systems may be used in performing various downhole monitoring and measurements, for example, quantification of vibrations, acoustics, pressure, and temperature changes. Particular types of such systems may include distributed acoustic sensing (DAS) and time-domain multiplexed optical interferometry (TDM). Current fiber optic systems may employ a light source, fiberoptic coupler, and multiple detectors.

The light source generates a highly coherent optical light along an optical fiber. As the light travels along the optical fiber, it may reflect back towards the source due to impurities of the fiber, also known as "Rayleigh backscatter," or may be purposefully reflected via reflectors, such as fiber Bragg gratings (FBG's). The reflected signals may be received by the fiberoptic coupler, which then generates and conveys variations of the signal to the multiple detectors. The detectors may then generate outputs to an analog-to-digital converter (ADC) for quantification of each received signal, wherein a computer utilizes the digitized signals to calculate an optical signal phase change. The calculated signal phase change corresponds to changes in a downhole parameter of interest.

One problem with current systems is saturation of the optical receiver(s) or subsequent analog to digital converters, which is a combined result of increased amplification to overcome attenuation and a large common mode signal component which consumes a large fraction of the optical receiver's and ADC's dynamic range and contributes noise to the optical phase measurements. The increased noise and inadvertent saturation may lead to incorrect phase measurements.

BRIEF DESCRIPTION OF THE DRAWINGS

Accordingly, there are disclosed herein systems and methods for improved interferometric high fidelity optical phase demodulation. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The problems outlined above are at least in part addressed by the disclosed optical sensing systems that employ a fiberoptic coupler and balanced photo-detectors to enhance measurement capabilities, such as decreasing the likelihood of receiver saturation, increasing useful dynamic range of the digitizer, and increasing the signal-to-noise ratio (SNR) by decreasing the noise floor. In some embodiments, a source may transmit an interrogation signal which is reflected to create a return signal that is received by a fiberoptic coupler. The fiberoptic coupler employs the return signal to generate three optical interferometry signals having mutual phase separations of 120°. Balanced photo-detectors receive combinations of the optical interferometry signals and responsively produce electrical difference signals that are converted by circuitry into interferometric optical phase measurements representing a downhole parameter of interest.

Figure 1:
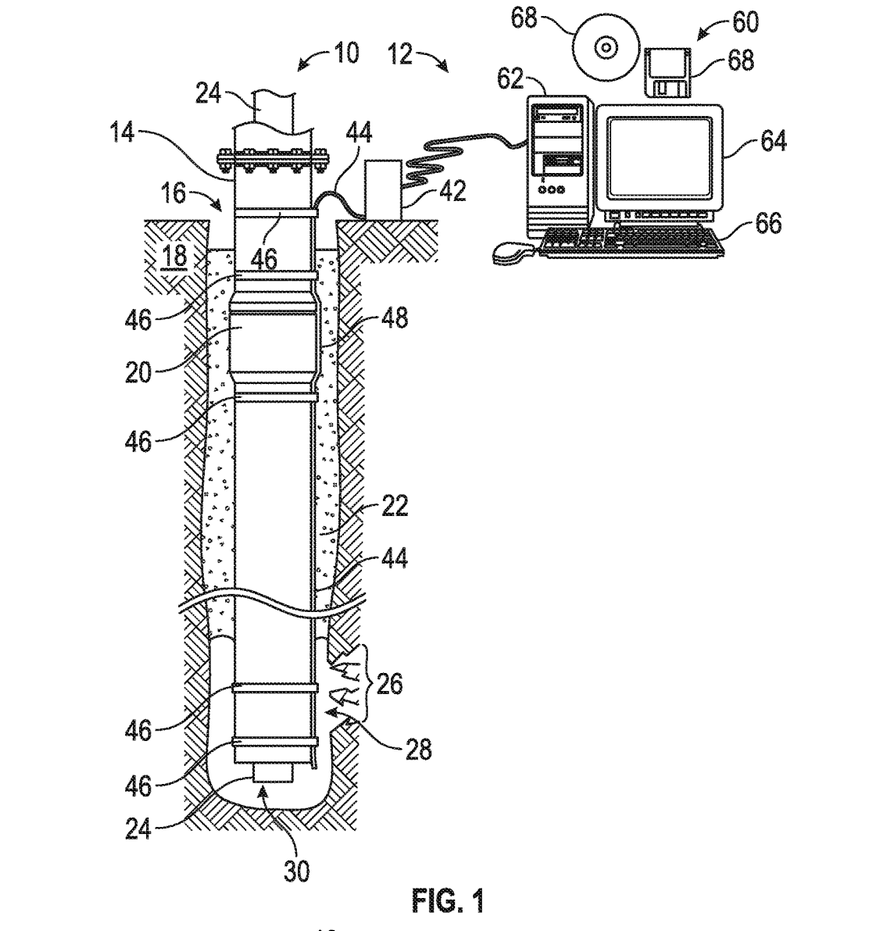
FIG. 1 shows an illustrative downhole optical sensor system in a production well.

FIG. 1 provides an illustrative context to assist with the ensuing explanation. FIG. 1 shows a well 10 equipped with an illustrative embodiment of a downhole optical sensor system 12. The well 10 shown in FIG. 1 has been constructed and completed in a typical manner, and it includes a casing string 14 positioned in a borehole 16 that has been formed in the earth 18 by a drill bit. The casing string 14 includes multiple tubular casing sections connected end-to-end by couplings 20. Within the well 10, cement 22 has been injected into an annulus between an outer surface of the casing string 14 and an inner surface of the borehole 16 and allowed to set. A production tubing string 24 has been positioned in an inner bore of the casing string 14.

The well 10 is adapted to guide a desired fluid (e.g., oil or gas) from a bottom of the borehole 16 to a surface of the earth 18. Perforations 26 have been formed at a bottom of the borehole 16 to facilitate the flow of a fluid 28 from a surrounding formation into the borehole 16 and thence to the surface via an opening 30 at the bottom of the production tubing string 24. Note that this well configuration is illustrative and not limiting on the scope of the disclosure. For example, the well 10 may be fully or partially cased, and the well 10 may be partially deviated or horizontal without departing from the scope of the disclosure. Moreover, the well 10 may be located offshore.

The downhole optical sensor system 12 includes an interface 42 coupled to a fiber optic cable 44 for distributed downhole sensing. As depicted, the interface 42 is located on the surface of the earth 18 near the wellhead, i.e., a "surface interface". In the embodiment of FIG. 1, the fiber optic cable 44 extends along an outer surface of the casing string 14 and is held thereto at various locations by bands 46 that extend around the casing string 14. A protective covering (not shown) may be installed over the fiber optic cable 44 at each of the couplings 20 to prevent the cable from being pinched or sheared by the coupling's 20 contact with the borehole 16 wall.

In at least some embodiments, the fiber optic cable 44 terminates at the surface interface 42 with an optical port (not shown) adapted for coupling the fiber optic cable to a light source and a detector. As will be described in more detail below, the light source transmits light pulses along the fiber optic cable 44. As the pulses of light propagate along the fiber optic cable 44, some of the pulse is scattered back along the fiber optic cable 44 from every point on the fiber optic cable 44 (also known as backscatter). The optical port communicates the backscattered light to the detector which produces electrical measurements of phase shifts in backscattered light at each point in the fiber. These phase shifts correspond to changes in downhole conditions (e.g., temperature, vibrations, etc.).

The illustrative downhole optical sensor system 12 of FIG. 1 further includes a computer 60 coupled to the surface interface 42 to control the light source and detector. The illustrated computer 60 includes a chassis 62, an output device 64 (e.g., a monitor as shown in FIG. 1, or a printer), an input device 66 (e.g., a keyboard), and information storage media 68 (e.g., magnetic or optical data storage disks). However, the computer may be implemented in different forms including, e.g., an embedded computer permanently installed as part of the surface interface 42, a portable computer that is plugged into the surface interface 42 as desired to collect data, and a remote desktop computer coupled to the surface interface 42 via a wireless link and/or a wired computer network. The computer 60 is adapted to receive the electrical measurement signals produced by the surface interface 42 and to responsively determine a distributed parameter such as, e.g., distributed acoustic sensing along the length of the casing string.

For example, the information storage media 68 may store a software program for execution by computer 60. The instructions of the software program may cause the computer 60 to collect phase differences of backscattered light derived from the electrical signal from surface interface 42 and, based at least in part thereon, to determine downhole parameters such as acoustic signals at each point on the fiber optic cable 44. The instructions of the software program may also cause the computer 60 to display the acoustic waveforms or envelopes associated with each point on the fiber via the output device 64.

Figure 2:
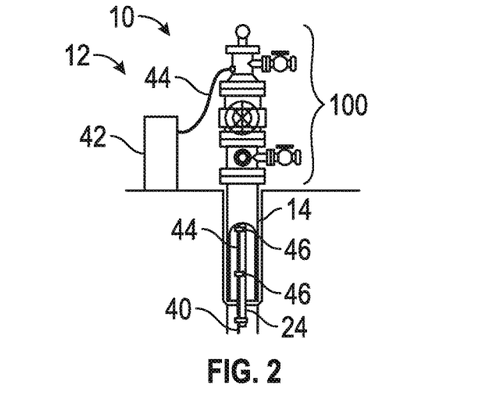
FIG. 2 shows an alternative downhole optical sensor system embodiment.

FIG. 2 shows an alternative embodiment of downhole optical sensor system 12 having the fiber optic cable 44 strapped to the outside of the production tubing 24 rather than the outside of casing 14. Rather than exiting the well 10 from the annular space outside the casing, the fiber optic cable 44 exits through an appropriate port in the "Christmas tree" 100, i.e., the assembly of pipes, valves, spools, and fittings connected to the top of the well to direct and control the flow of fluids to and from the well. The fiber optic cable 44 extends along the outer surface of the production tubing string 24 and is held against the outer surface of the of the production tubing string 24 at spaced apart locations by multiple bands 46 that extend around the production tubing string 24. The downhole optical sensor system 12 of FIG. 2 optionally includes a hanging tail 40 at the bottom of a borehole. In other system embodiments, the fiber optic cable 44 may be suspended inside the production tubing 24 and held in place by a suspended weight on the end of the fiber. In further embodiments, such as a wireline, slickline, or coiled tubing deployment, the sensing fiber may be a part of or inside a cable lowered into the well during logging operations.

Figure 3A:
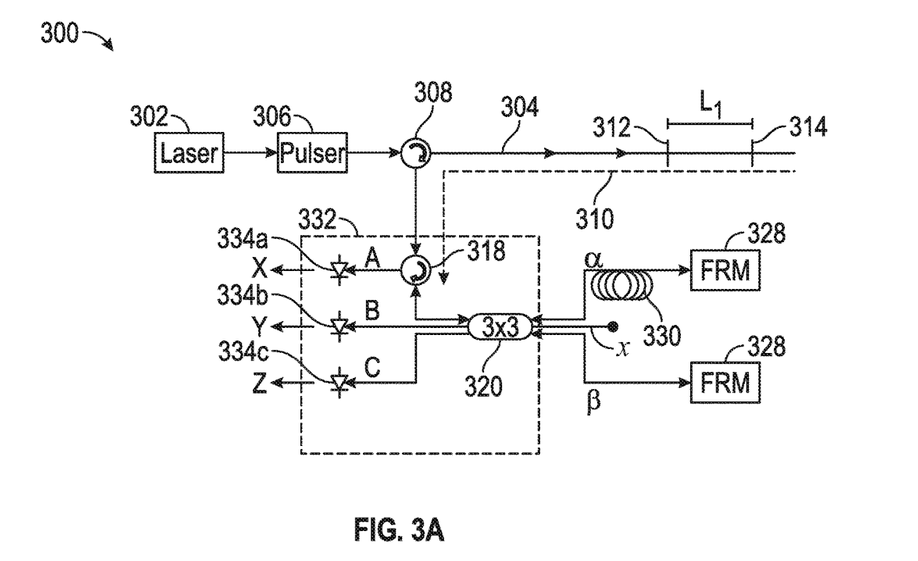
FIG. 3A shows an illustrative distributed optical phase interferometric sensing system.

FIG. 3A depicts one illustrative optical sensor system 300. The optical sensor system 300 includes a source 302, such as a laser, that generates an interrogation signal on a distributed sensing fiber 304. The source 302 may be a pulsed laser, or alternatively, it may generate a non-pulsed interrogation signal and employ a pulser 306 to pulse the interrogation signal. The interrogation signal may then interact with a first circulator 308 which couples the pulsed interrogation signal to the distributed sensing fiber 304.

As each interrogation signal pulse travels through the distributed sensing fiber 304, a portion of the pulse energy reflects from various points back towards the source through the same distributed sensing fiber 304. For illustrative purposes, the reflected signal is depicted in FIG. 3 as return signal 310. The return signal 310 may be generated from discrete reflective elements placed along the distributed sensing fiber 304, such as fiber Bragg gratings (FBGs) arranged at positions 312 and 314. Alternatively, when performing distributed acoustic sensing (DAS), the return signal 310 may be generated from inherent reflection within the distributed sensing fiber 304 due to fiber imperfections (e.g., impurities). When such scattering occurs elastically, it may be known as "Rayleigh Backscatter." In FIG. 3A, the backscatter is depicted as occurring at the positions 312 and 314 along the distributed sensing fiber 304. However, those of skill in the art will recognize that there may be numerous other reflection points along the distributed sensing fiber 304.

The first circulator 308 additionally couples the return signal 310 to a receiver 332. As depicted, the receiver 332 includes a second circulator 318 which receives the return signal 310 and propagates it to a 3×3 fiberoptic coupler 320. The coupler 320 distributes the return signal 310 across three paths labeled $\alpha$, $\beta$, $\chi$. The $\chi$ path is terminated with an absorber and is not used further. The $\alpha$ and $\beta$ paths are each terminated with a Faraday rotator mirror (FRM) 328 that reflects the signals to the coupler 320, albeit with a polarization reversal that compensates for any polarization-shifts inadvertently introduced along the $\alpha$ and $\beta$ paths. A delay coil 330 is included in the $\alpha$ path to introduce a delay in the reflected signal relative to the signal reflected along the $\beta$ path.

The fiberoptic coupler 320 combines the signals from the $\alpha$ and $\beta$ (and the unused $\chi$) paths to form three optical interferometry signals A, B, C. The delay introduced between the $\alpha$ and $\beta$ paths corresponds to the distance or "sensing window" L1 between the reflection points 312, 314 on the distributed sensing fiber 304, enabling the phase change incurred over this length to be measured and monitored as an interferometric signal phase. Due to the nature of the 3×3 coupler, the optical interferometry signals A, B, C have mutual phase separations of 120°. For example, as the $\alpha$ and $\beta$ signals enter the 3×3 coupler, the interferometric signal A exiting the coupler may be $\alpha+\beta\angle 0°$, B may be) $\alpha+(\beta\angle+120°$, and C may be) $\alpha+(\beta\angle-120°)$.

System 300 implements single-ended detectors 334a-c shown as a first, second, and third single-ended detectors 334a, 334b, and 334c, respectively) which receive the optical interferometry signals A, B, and C. Examples of such single-ended detectors 334a-c may include p-intrinsic-n field-effect-transistors (PINFETs), where optical receivers and high gain transimpedance amplifiers are used. In exemplary operation, measurements such as dynamic strain, acoustics, and vibrations may be determined through analysis of the outputs of the single-ended detectors 334a-c to determine the associated optical phase shift. The following equations may be used to represent the optical coupler 320 outputs:

$$A = k + \text{Cos}[2f\pi t]P_\alpha + \text{Cos}[2f\pi t + \phi]P_\beta \quad (1)$$

$$B = k + \text{Cos}[2f\pi t]P_\alpha + \text{Cos}\left[2f\pi t + \phi + \left(\frac{2\pi}{3}\right)\right]P_\beta \quad (2)$$

$$C = k + \text{Cos}[2f\pi t]P_\alpha + \text{Cos}\left[2f\pi t + \phi - \left(\frac{2\pi}{3}\right)\right]P_\beta \quad (3)$$

where k represents the optical power of non-interfering signals (e.g., ASE noise from an optical amplifier (not shown) and light with mismatched polarization), f represents the optical frequency of the interrogation light, and $P_\alpha$ and $P_\beta$ represent optical amplitude of the two signals from optical paths α and β. As earlier noted, the optical coupler 320 of FIG. 3A generates optical interferometry signals A, B, and C, which are separated by 120°, thus signal B is shifted by $$+120°\left(=\frac{2\pi}{3}\right)$$

and signal C is shifted by $$-120°\left(=-\frac{2\pi}{3}\right).$$

The following equations may be used to calculate the output of the square-law single-ended detectors 334a-c (labeled as X, Y, and Z):

$$X=(\tfrac{1}{2})(2k^2+P_\alpha^2+2\text{ Cos }[\phi]P_\alpha P_\beta+P_\beta^2) \quad (4)$$

$$Y=(\tfrac{1}{2})(2k^2+P_\alpha^2-(\text{Cos }[\phi]+\sqrt{3}\text{ Sin }[\phi])P_\alpha P_\beta+P_\beta^2) \quad (5)$$

$$Z=(\tfrac{1}{2})(2k^2+P_\alpha^2+(-\text{Cos }[\phi]+\sqrt{3}\text{ Sin }[\phi])P_\alpha+P_\beta^2) \quad (6)$$

Using the X, Y, and Z terms, the in-phase (I) and quadrature (Q) terms may be calculated by:

$$I=X+Y-2Z=(\tfrac{3}{2})(\text{Cos }[\phi]-\sqrt{3}\text{ Sin }[\phi])P_\alpha P_\beta \quad (7)$$

$$Q=\sqrt{3}(X-Z)=(\tfrac{3}{2})(\sqrt{3}\text{ Cos }[\phi]+\text{Sin }[\phi])P_\alpha P_\beta \quad (8)$$

albeit with a coordinate rotation of −π/3. Taking this coordinate rotation into account gives the following equation:

$$\phi = \text{ArcTan}\left[\frac{Q}{I}\right]+\left(\frac{\pi}{3}\right) \quad (9)$$

Unfortunately, the single-ended detectors 334a-c are square law detectors, thus detector output equations (i.e., equations 4-6) contain squared terms ($k^2$, $P_\alpha^2$, and $P_\beta^2$) that do not provide phase information and create a constant DC signal that does not change as the optical phase changes. Therefore, implementation of single-ended detectors 334a-c may result in saturation of the single-ended detectors 334a-c and failure to utilize the full dynamic range of the analog-to-digital circuitry.

Figure 3B:
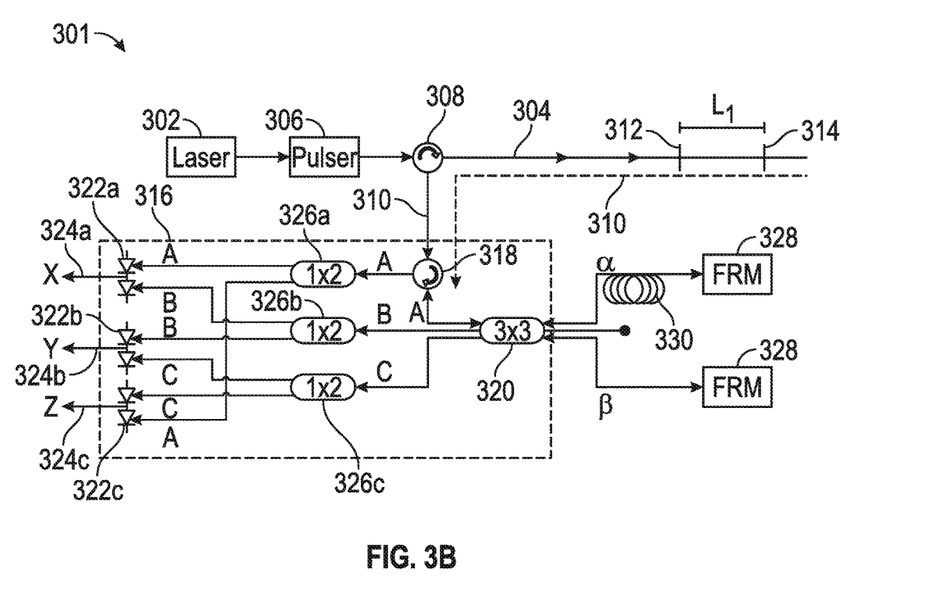
FIG. 3B shows an illustrative distributed optical phase interferometric sensing system with high-fidelity demodulation.

FIG. 3B depicts an improved optical computing system 301 having high-fidelity demodulation. In many ways, the optical sensor system 301 is similar to the optical sensor system 300 and therefore may be best understood with reference thereto, where like numerals represent like elements that will not be described again in detail. However, the optical sensor system 301 advantageously replaces the single-ended detectors 334a-c of FIG. 3A with balanced photo-detectors 322a-c (shown as a first, second, and third balanced photo-detector, 322a, 322b, and 322c, respectively). Unlike the single-ended detectors, the balanced photo-detectors measure difference signals, which helps alleviate the issues previously mentioned.

As depicted, the optical sensor system 301 includes the source 302 and pulser 306 which generates an interrogation signal and are coupled to the distributed sensing fiber 304 via the first circulator 308. The interrogation signal reflects at certain points along the distributed sensing fiber 304, such as at positions 312 and 314, thereby generating the return signal 310. The first circulator 308 further couples the return signal 310 to a receiver 316 which includes the 3×3 fiberoptic coupler 320. The fiberoptic coupler 320 operates on the return signal 310 as previously explained to produce three optical interferometry signals A, B, C. Splitters 326a-c (shown as a first, second, and third splitter, 326a, 326b, and 326c, respectively) split at least some of the optical interferometry signals A-C across two paths, enabling each of the balanced photo-detectors 322a-c (shown as a first, second, and third balanced photo-detector, 322a, 322b, and 322c, respectively) to receive two different optical interferometry signals A-C. The splitters 326a-c enable each of the optical interferometry signals A-C to be received by two of the balanced photo-detectors 322a-c.

Each of the balanced photo-detectors 322a-c receives a pair of optical interferometry signals A, B, and C from the fiberoptic coupler 320 and responsively generates a corresponding electrical difference signal 324a-c (shown as a first, second, and third electrical difference signal 324a, 324b, and 324c, respectively). In one example configuration, each balanced photo-detector 322a-c may be comprised of two p-intrinsic-n (PIN) optical receivers and a single transimpedance amplifier. The amplifier will only see the difference signal between the two PINs, and therefore only amplifies the difference. Advantageously, this removes "common-mode" signals before amplification, thus removing undesirable signal energy that may contain noise and/or waste the dynamic range of the optical receiver or analog-to-digital converter (ADC) circuitry. One example balanced photo-detector is made by ThorLabs, model PDB420C.

The electrical difference signals 324a-c may be received by circuitry arranged downhole or uphole, such as the computer 60 (FIG. 1), that calculates an interferometric phase of the return signal 310 corresponding to a change in downhole conditions (e.g., vibration of the distributed sensing fiber 304, temperature, and the like). The circuitry may include one or more analog to digital converters (i.e., digitizers) configured to digitize the electrical difference signals 324a-c, along with a processing unit (e.g., computer 60) configured to combine the digitized electrical difference signals 324a-c to obtain an interferometric phase signal.

The circuitry may be configured to "window" or "filter" the received electrical difference signals 324a-c based on a time delay after each light pulse is generated, thereby associating the measurements with a position on the distributed sensing fiber 304. Moreover, implementation of a high speed digitizer may allow "windowing" multiple positions along the distributing sensing fiber 304. For example, an ADC sampling rate of 100 MHz may provide exemplary sampling windows distributed along the fiber at approximately one meter intervals due to the speed of light in the fiber with a combined bidirectional travel time of the interrogation signal and the return signal 310 of approximately 10 ns per meter.

With the use of balanced photo-detectors 322a-c, the photo-detector output equations (yielding the electrical difference signals 324a-c labeled as X, Y, and Z) become:

$$X = \left(\frac{1}{8}\right)(3\text{Cos}[\phi] + \sqrt{3}\,\text{Sin}[\phi])P_\alpha P_\beta \quad (10)$$

$$Y = \left(-\frac{1}{4}\right)\sqrt{3}\,\text{Sin}[\phi]P_\alpha P_\beta \quad (11)$$

$$Z = \left(\frac{1}{8}\right)(-3\text{Cos}[\phi] + \sqrt{3}\,\text{Sin}[\phi])P_\alpha P_\beta \quad (12)$$

Due to the subtraction characteristic of the balanced photo-detectors 322a-c, the electrical difference signals no longer include the amplitude-squared terms $P_\alpha^2$, $P_\beta^2$, and $k^2$ (compare with equations 4-6). In this manner the high-fidelity configuration eliminates a DC component of the signal, thus avoiding any waste of the optical receiver's or ADC's dynamic range and yielding a more accurate signal measurement. Similarly resulting therefrom is the reduced likelihood of signal saturation. Additionally, noise is removed, thus lowering the noise floor and increasing SNR to produce a more accurate signal. The noise floor may be lowered, for example, by 4 to 6 dB over single-ended detector implementations.

Based on equations 10-12, the I and Q components may now be calculated as:

$$I = \sqrt{3}\,\frac{X - Y - Z}{2} = \left(\frac{3}{8}\right)(\sqrt{3}\,\text{Cos}[\phi] + \text{Sin}[\phi])P_\alpha P_\beta \quad (13)$$

$$Q = -(X + 3Y - Z) = \left(\frac{3}{8}\right)(-\text{Cos}[\phi] + \sqrt{3}\,\text{Sin}[\phi])P_\alpha P_\beta \quad (14)$$

including a coordinate rotation of $\pi/6$. Taking this coordinate rotation into account yields:

$$\phi = \text{ArcTan}\left[\frac{Q}{I}\right] - \left(\frac{\pi}{6}\right) \quad (15)$$

Figure 3C:
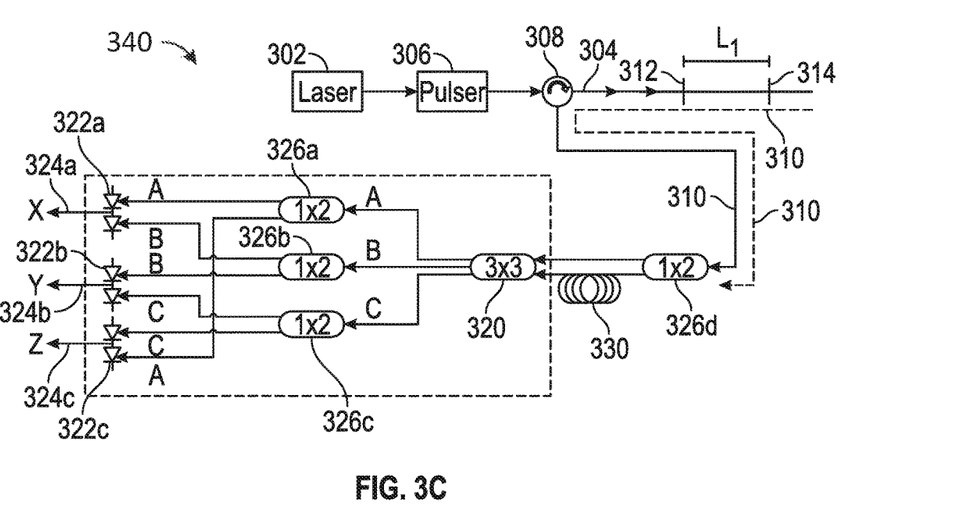
FIG. 3C shows another illustrative distributed optical phase interferometric sensing system with high-fidelity demodulation.

FIG. 3C is another illustrative distributed optical phase interferometric sensing system 340 with high-fidelity demodulation. In many ways, the optical sensor system 340 is similar to the optical sensor system 301 and therefore may be best understood with reference thereto, where like numerals represent like elements that will not be described again in detail. However, while the optical sensor system 301 represents a Michelson compensating interferometer configuration due to having FRM's 328, the optical sensor system 340 represents a Mach-Zehnder compensating interferometer due to lack of inclusion thereof and operability differences in the delay path and delay coil 330. Due to the interrogation signal having a round trip time of 2*L1, the delay path and delay coils 330 typically account for an approximately equal amount of travel time. To accomplish this, the length of the delay coil 330 of FIG. 3B may be approximately equal to the length due to the return signal 310 passing through the delay coil 330 twice because of reflection off the FRM 328, thus creating an approximately equal delay time of 2*L1. However, the delay coil 330 of FIG. 3C may be approximately twice as long (i.e., 2*L1) because the return signal 310 will only pass through the delay coil 330 once.

Figure 4A:
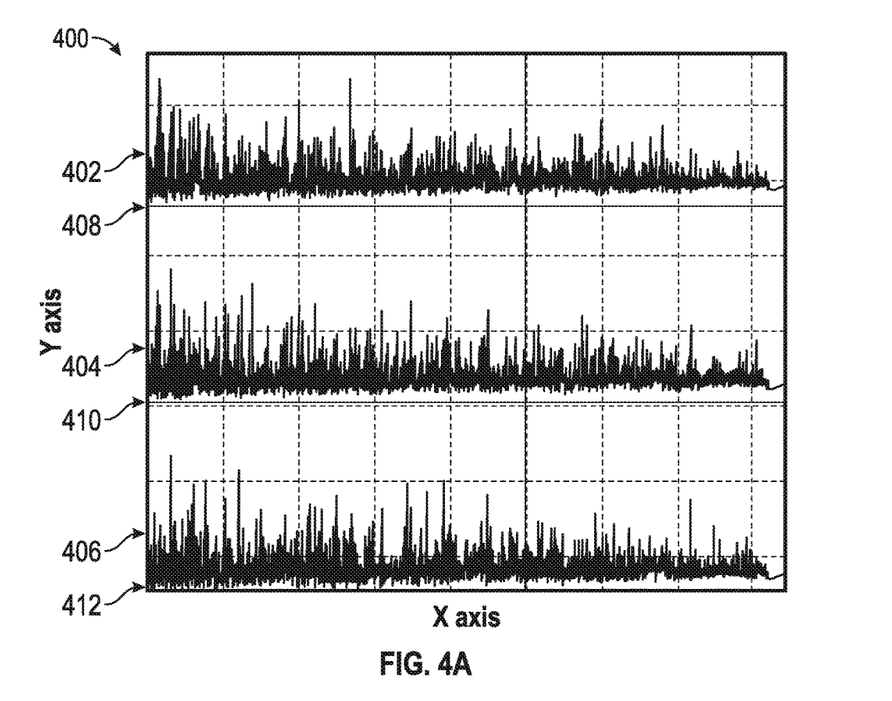
FIGS. 4A and 4B show illustrative measurement signals from the first illustrative system.
Figure 4B:
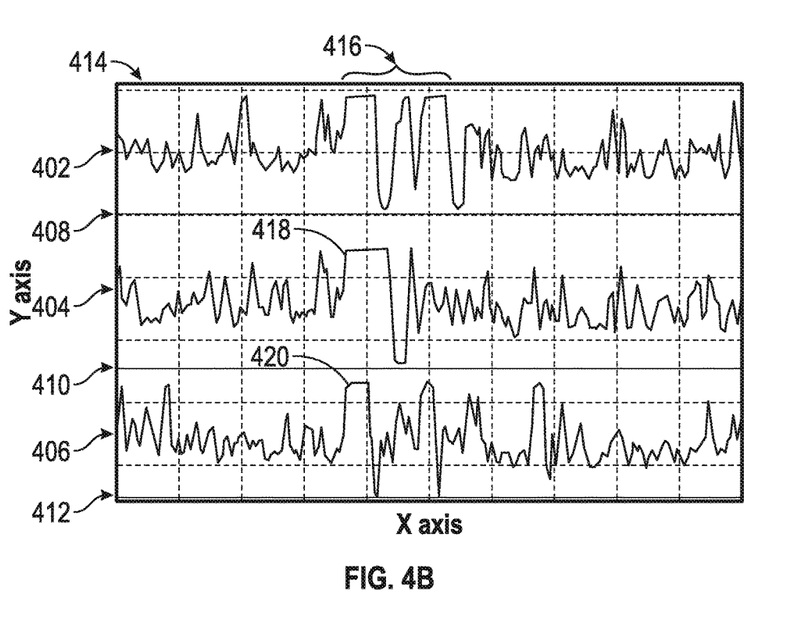
Figure 4C:
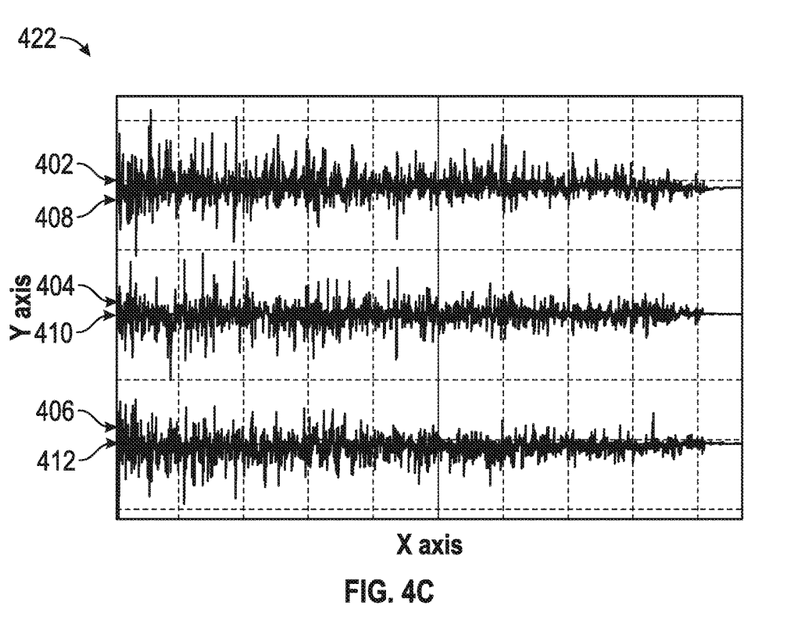
FIG. 4C shows illustrative measurement signals from the high-fidelity system.

FIGS. 4A-C are graphs 400, 414, and 422 depicting X,Y,Z signal measurements from optical sensing systems 300 and 301. The y-axis represents voltage and the x-axis represents reflection position along the distributed sensing fiber 304. The graph 400 of FIG. 4A illustrates signals 402, 404, and 406 corresponding to the detector outputs 324a, 324b, and 324c of the single-ended detectors 334a-c of FIG. 3A. FIG. 4B is an enlarged view of this graph. Because system 300 relies on single-ended detectors, all measurements are above the zero-voltage lines 408, 410, and 412. Moreover, as seen in FIG. 4B, optical receiver saturation may occur as seen at locations 416, 418, and 420 (hence, the top of each signal is flat), thus precluding proper phase demodulation and determination.

The graph 422 of FIG. 4C, however, illustrates the X,Y,Z signals as measured by optical system 301, wherein the signals 402, 404, and 406 correspond to the detector outputs 324a-c of the balanced photo-detectors 322a-c. As depicted, the signals 402, 404, and 406 are now centered along the zero-voltage lines 408, 410, and 412 due to implementation of balanced photo-detectors 322a-c. This configuration avoids wasting the dynamic range of the optical receivers and ADCs. Moreover, the interrogation signal power may be increased, thus also increasing the backscatter reflection signal power without saturating the digitizer.

Figure 5:
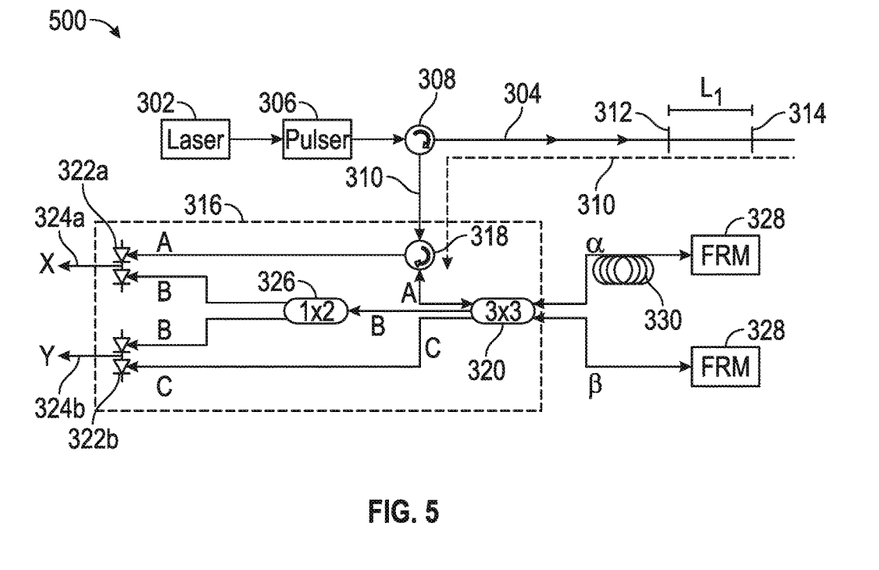
FIG. 5 shows an alternative high-fidelity system embodiment having a reduced component count.

FIG. 5 shows another illustrative optical sensor system 500. The optical sensor system 500 is similar to the optical sensor system 301 and therefore may be best understood with reference thereto, where like numerals represent like elements that will not be described again in detail. However, where the optical sensor system 301 employs three splitters 326a-c and three balanced photo-detectors 322a-c, the optical sensor system 500 includes only a single splitter 326 and two balanced photo-detectors 322a-b generating corresponding electrical difference signals 324a-b.

The use of fewer balanced photo-detectors 322a-c enables the use of fewer ADCs to determine the optical phase signal. Moreover, as the receivers are duplicated for each interrogation beam wavelength, the component count reduction increases in a linear fashion as the number of wavelengths increases. For example, if two wavelengths are used simultaneously, the optical sensor system 301 would require 6 splitters 326, 6 balanced photo-detectors 322, and 6 ADCs. However, the optical sensor system 500 would only require 2 splitters 326, 4 balanced photo-detectors 322, and 4 ADCs.

A potential downside to the optical sensor system 500, however, is the power reduction of signal B by approximately 50% due to the splitter 326, whereas signals A and C maintain full power. However, this imbalance may be compensated by either attenuating signals A and C with an attenuator (not shown) prior to the signals being received by the balanced photo-detectors 322 or by modifying the optical coupler 320 to generate signal B with twice as much power as signals A and C.

Exemplary equations for FIG. 5 are as follows:

$$A = \left(\frac{3}{4}\right)[k + \text{Cos}[2f\pi t]P_\alpha + \text{Cos}[2f\pi t + \phi]P_\beta] \quad (16)$$

-continued $$B = \left(\frac{3}{2}\right)\left[k + \text{Cos}[2f\pi t]P_\alpha + \text{Cos}\left[2f\pi t + \phi + \left(\frac{2\pi}{3}\right)\right]P_\beta\right] \quad (17)$$

$$C = \left(\frac{3}{4}\right)\left[k + \text{Cos}[2f\pi t]P_\alpha + \text{Cos}\left[2f\pi t + \phi - \left(\frac{2\pi}{3}\right)\right]P_\beta\right] \quad (18)$$

The difference signals X and Y may be calculated by the equations:

$$X = (9/32)(3 \text{ Cos } [\phi] + \sqrt{3} \text{ Sin } [\phi])P_\alpha P_\beta \quad (19)$$

$$Y = (-9/16)\sqrt{3} \text{ Sin } [\phi]P_\alpha P_\beta \quad (20)$$

and I, Q, and φ may be calculated by:

$$I = \sqrt{3}(X + Y) = \left(\frac{27}{32}\right)(\sqrt{3} \text{Cos}[\phi] - \text{Sin}[\phi])P_\alpha P_\beta \quad (21)$$

$$Q = -(X - y) = \left(\frac{27}{32}\right)(\text{Cos}[\phi] + \sqrt{3} \text{Sin}[\phi])P_\alpha P_\beta \quad (22)$$

$$\phi = \text{ArcTan}\left[\frac{Q}{I}\right] + \left(\frac{\pi}{6}\right) \quad (23)$$

Figure 6:
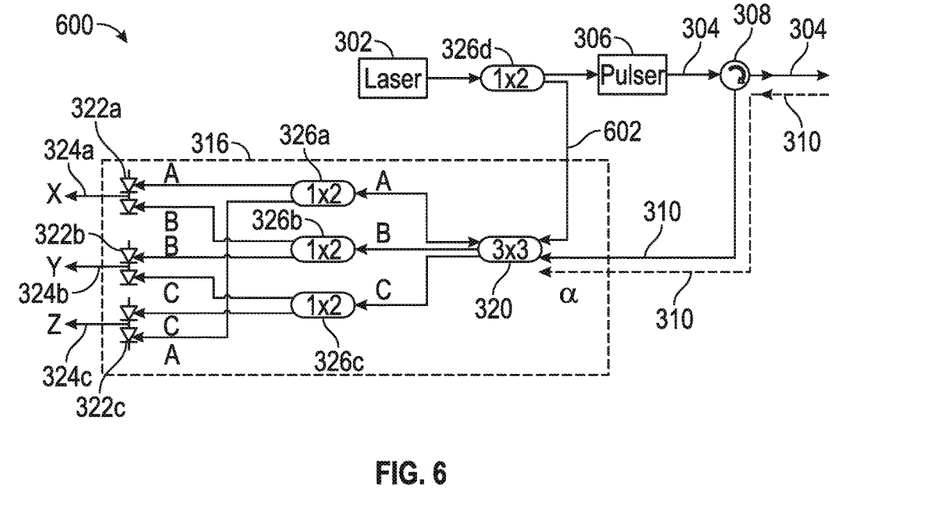
FIG. 6 shows an illustrative high-fidelity system embodiment having an alternative interferometry configuration.

FIG. 6 shows yet another optical sensor system 600. The optical sensor system 600 is similar to the optical sensor systems 301 and 500, and therefore may be best understood with reference thereto, where like numerals represent like elements that will not be described again in detail. The optical sensor system 600, however, uses the source 302 as a "local oscillator" (LO) coupled to the fiberoptic coupler 320 via a splitter 326d (similar to the splitters 326a-c) and LO signal path 602.

FIG. 6 can be represented by the exemplary equations below which are similar to the equations of FIG. 3B (equations 10-15), with one notable change being that the $P_\beta$ term has been replaced by $P_{LO}$ (representing amplitude of the LO).

$$X = \left(\frac{1}{8}\right)(3\text{Cos}[\phi] + \sqrt{3} \text{ Sin}[\phi])P_{LO}P_\alpha \quad (24)$$

$$Y = \left(-\frac{1}{4}\right)\sqrt{3} \text{ Sin}[\phi]P_{LO}P_\alpha \quad (25)$$

$$Z = \left(\frac{1}{8}\right)(-3\text{Cos}[\phi] + \sqrt{3} \text{ Sin}[\phi])P_{LO}P_\alpha \quad (26)$$

$$I = \sqrt{3}\frac{X - Y - Z}{2} = \left(\frac{3}{8}\right)(\sqrt{3} \text{Cos}[\phi] + \text{Sin}[\phi])P_\alpha P_{LO} \quad (27)$$

$$Q = -(X + 3Y - Z) = \left(\frac{3}{8}\right)(-\text{Cos}[\phi] + \sqrt{3} \text{ Sin}[\phi])P_\alpha P_{LO} \quad (28)$$

$$\phi = \text{ArcTan}\left[\frac{Q}{I}\right] + \left(\frac{\pi}{6}\right) \quad (29)$$

The $P_{LO}$ term may advantageously improve modulation efficiency of the interference signal and improve the SNR of the phase measurement because the power of the LO is typically much higher than the power of the backscatter signal.

Figure 7:
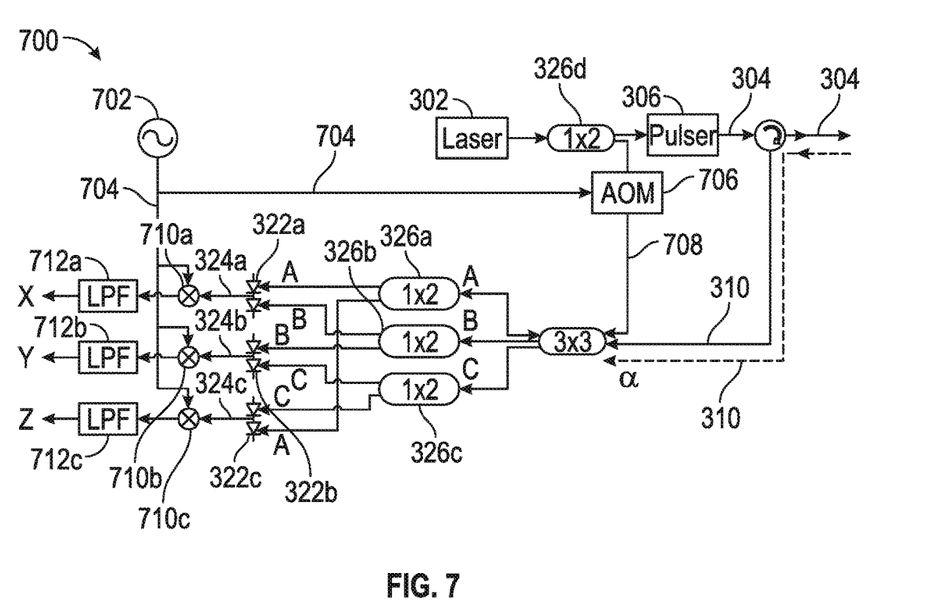
FIG. 7 shows an illustrative high-fidelity system embodiment having the alternative interferometry configuration with heterodyning.

Similar results can be achieved with a heterodyne DAS system, such as the optical sensor system 700 of FIG. 7. The optical sensor system 700 is similar to the optical sensor system 600, and may be best understood with reference thereto, where like numerals represent like elements that will not be described again in detail. However, the optical sensor system 700 illustrates the principles disclosed herein with a heterodyne DAS system, where the optical frequency of the source 302 interrogation signal is different from a frequency shifted signal 708. As depicted, a local oscillator (LO) 702 provides an electrical signal or local oscillator signal 704 at an intermediate frequency (IF), for example, in the range of 10 Mhz to 100 Mhz. The local oscillator (LO) 702 generates the local oscillator output signal 704 which is conveyed to an optical frequency shifter 706. The optical frequency shifter 706 combines the local oscillator output signal 704 with the optical signal from the source 302, thereby generating a frequency shifted signal 708. In some embodiments, the optical frequency shifter 706 may be an acousto-optic modulator (AOM). In another embodiment, the frequency shifter may be an optical phase shifter driven by a sawtooth or ramp function to effectively shift the optical frequency using the Serrodyne method. In further embodiments, the optical frequency shifter 706 may alternatively be placed in the path of the interrogation signal along the distributed sensing fiber 304.

The IF local oscillator output signal 704 may also be conveyed to frequency mixers 710a-c (depicted as a first mixer 710a, second mixer 710b, and third mixer 710c). One exemplary mixer 710 that may be employed is the model ZX05-1L+ by Mini-Circuits. The electrical difference signals 324a-c will contain a carrier signal at a frequency equal to the optical frequency difference between the shifted signal 708 and the interrogation pulse from the source 302, this difference being equal to the intermediate frequency produced by the local oscillator 702. Each of the mixers mixes the local oscillator output signal 704 with one of the electrical difference signals 324a-c, thereby shifting the electrical difference signals 324a-c back to baseband. However, this also generates a frequency doubled term which may be filtered out by low-pass-filters 712a-c. The X, Y, and Z signals from the low-pass-filters 712a-c may then be used to extract the I, Q signals and the interferometric phase using equations 10-15 above.

Figure 8:
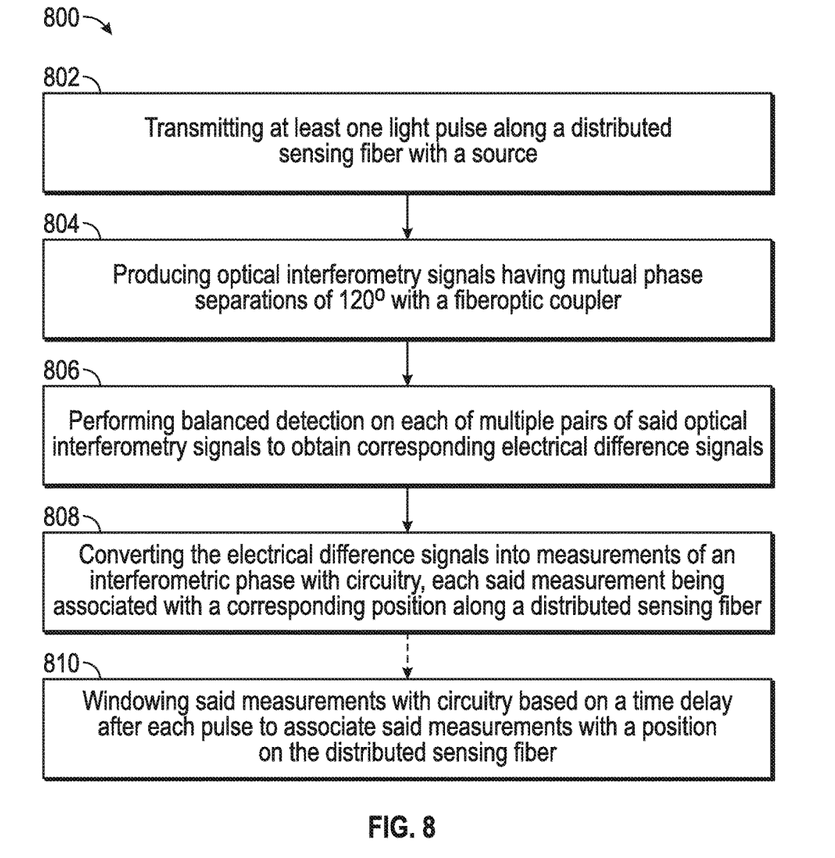
FIG. 8 is a flowchart of an illustrative interferometric high-fidelity optical phase demodulation method.

FIG. 8 shows a flowchart of an illustrative interferometric phase demodulation method 800. It should be understood that the method 800 may vary and may, for example, include more or less steps, and the steps may be performed in parallel or in a different order. As shown, the method 800 comprises transmitting at least one light pulse or interrogation signal along a distributed sensing fiber with a source, as at step 802. The interrogation signal travels down the sensing fiber, wherein a return signal is generated at various points along the fiber due to fiber impurities.

The return signal may be received by a receiver having a fiberoptic coupler producing optical interferometry signals having mutual phase separations of 120°, as at block 804. The method may further include splitting the return signal across two optical paths with the receiver prior to generation of the interferometry signals. In some embodiments, the optical paths may be reflectively terminated, for example, with faraday rotator mirrors.

The interferometry signals may be split by one or more splitters prior to being received by balanced photo-detectors. The balanced photo-detectors then perform balanced detection on each of multiple pairs of said optical interferometry signals to obtain corresponding electrical difference signals, as at step 806. At step 808, the method 800 performs converting the electrical difference signals into measurements of an interferometric phase with circuitry, each said measurement being associated with a corresponding position along a distributed sensing fiber. In some embodiments, the conversion may include digitizing said electrical difference signals with at least one analog to digital converter. Additionally, the conversion may include processing the digitized electrical difference signals with a processing unit.

In some embodiments, the position along the distributed sensing fiber may be determined by windowing said measurements with circuitry based on a time delay after each pulse to associate said measurements with a position on the distributed sensing fiber, as at step 810.

Figure 9:
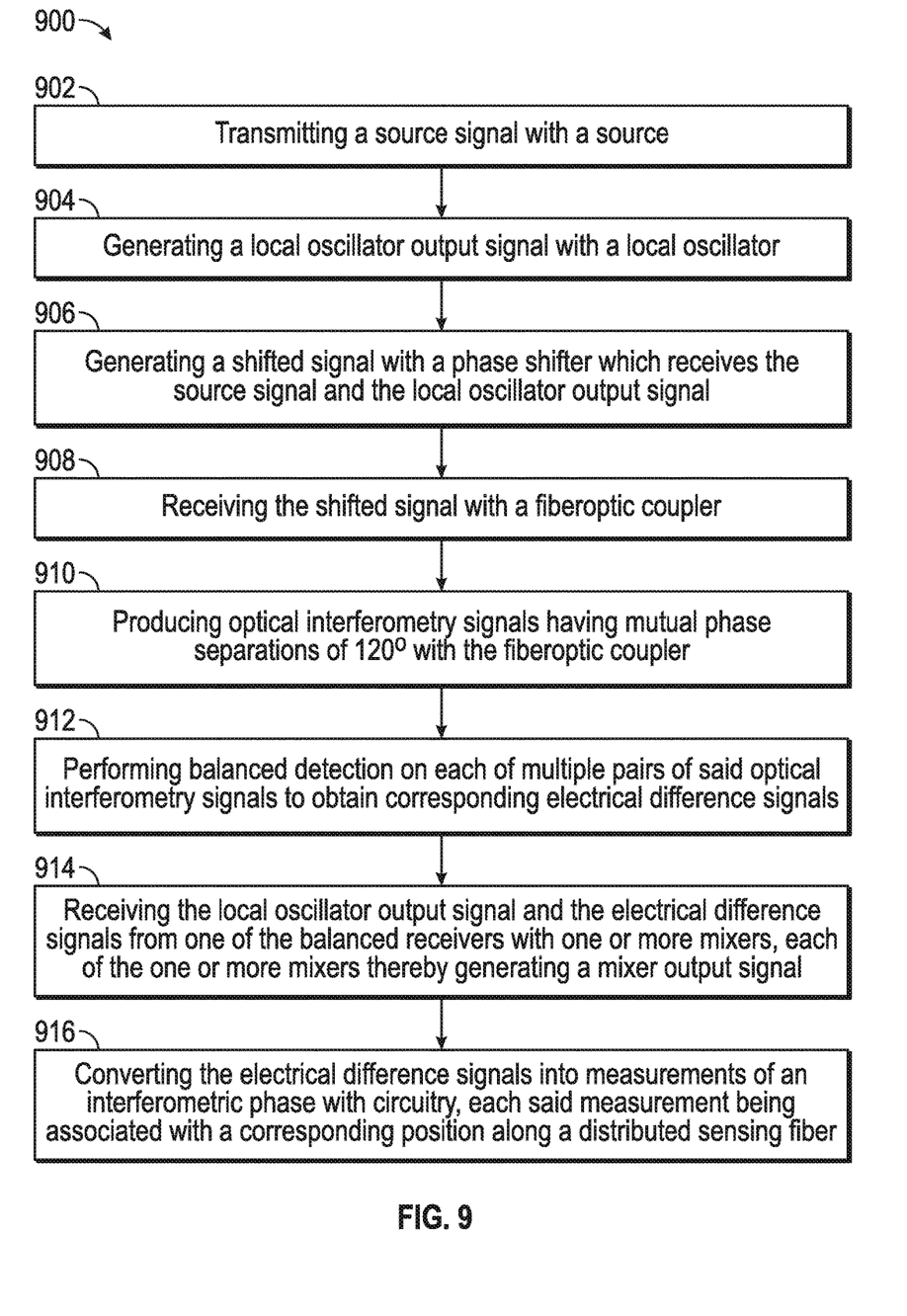
FIG. 9 is a flowchart of an illustrative interferometric high-fidelity optical phase demodulation method with heterodyning.

FIG. 9 shows an alternative flowchart of an illustrative interferometric phase demodulation method 900. It should be understood that the method 900 may vary and may, for example, include more or less steps. As shown, similar to the method 800, the method 900 comprises transmitting a source signal with a source, as at step 902. At step 904, generating a local oscillator output signal with a local oscillator is performed. A frequency shifter which receives the source signal and the local oscillator signal generates a shifted signal, as at step 906, the shifted signal being received with a fiberoptic coupler.

Similar to the method 800, the fiberoptic coupler of method 900 produces optical interferometry signals having mutual phase separations of 120°, as at step 910. The interferometry signals may be split by one or more splitters prior to being received by balanced receives. The balanced photo-detectors then perform balanced detection on each of multiple pairs of said optical interferometry signals to obtain corresponding electrical difference signals, as at step 912. Receiving the local oscillator output signal and the electrical difference signals may be performed with one or more mixers, each of said one or more mixers thereby generating a mixer output signal, as at step 914. In some embodiments, filtering may be performed by one or more low pass filters which receive the mixer output signals and generate a filtered output signal therefrom.

At step 916, the method 900 performs converting the electrical difference signals into measurements of an interferometric phase with circuitry, each said measurement being associated with a corresponding position along a distributed sensing fiber.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

Embodiments disclosed herein include:

A: An interferometric system with high-fidelity optical phase demodulation, comprising a receiver having a fiberoptic coupler that produces optical interferometry signals having mutual phase separations of 120° and balanced photo-detectors that each produce an electrical difference signal based on a respective pair of said optical interferometry signals, and circuitry that converts the electrical difference signals into measurements of an interferometric phase.

B: A method of measuring interferometric phase with high-fidelity optical phase demodulation, comprising producing optical interferometry signals having mutual phase separations of 120° with a fiberoptic coupler, performing balanced detection on each of multiple pairs of said optical interferometry signals to obtain corresponding electrical difference signals, and converting the electrical difference signals into measurements of an interferometric phase with circuitry, each said measurement being associated with a corresponding position along a distributed sensing fiber.

Each of embodiments A and B may have one or more of the following additional elements in any combination:

Element 1: including a source that transmits at least one light pulse along a distributed sensing fiber, where the circuitry windows the measurements based on a time delay after each pulse to associate the measurements with a position on the distributed sensing fiber. Element 2: where the distributed sensing fiber couples one or more return signals to the receiver, and where the receiver splits the one or more return signals across two optical paths having a propagation delay difference to enable the fiberoptic coupler to produce the optical interferometry signals. Element 3: including a first circulator that couples the at least one light pulse from the source to the distributed sensing fiber, and further couples the return signal to the receiver. Element 4: where the fiberoptic coupler splits the return signal across the two optical paths, and where the two optical paths are reflectively terminated. Element 5: where the optical paths are reflectively terminated with faraday rotator mirrors. Element 6: where the receiver further includes a second circulator that couples the return signal to the fiberoptic coupler, and that further couples one of the optical interferometry signals to at least one of the balanced photo-detectors. Element 7: where the receiver further includes one or more splitters that each distribute one of the optical interferometry signals to two of the balanced photo-detectors. Element 8: where the optical interferometry signals include three optical interferometry signals, and where the balanced photo-detectors include three balanced photo-detectors that each produce an electrical difference signal between every pair of the three optical interferometry signals. Element 9: including a circulator that couples the at least one light pulse from the source to the distributed sensing fiber, and further couples a return signal to the receiver, an optical frequency shifter that couples the source to the fiberoptic coupler, a local oscillator which generates a local oscillator output signal, and one or more frequency mixers, each mixer configured to receive the local oscillator output signal and the electrical difference signals from one of the balanced photo-detectors, and thereby generate a mixer output signal. Element 10: where the optical frequency shifter is an acousto-optic modulator. Element 11: where the optical frequency shifter is an optical phase shifter driven by a sawtooth or linear ramp function. Element 12: including one or more low-pass filters, each low-pass filter coupled to one of the mixers and configured to generate a filtered output signal. Element 13: where the circuitry includes at least one analog to digital converter that digitizes the electrical difference signals, and a processing unit that combines digitized electrical difference signals to obtain the interferometric phase signal.

Element 14: including transmitting at least one light pulse along a distributed sensing fiber with a source, and windowing the measurements with circuitry based on a time delay after each pulse to associate the measurements with a position on the distributed sensing fiber. Element 15: where the distributed sensing fiber couples one or more return signals to a receiver, the method further including splitting the one or more return signals across two optical paths with the receiver, where the two optical paths have a propagation delay difference to enable the fiberoptic coupler to produce the optical interferometry signals. Element 16: where the fiberoptic coupler splits the return signal across the two optical paths, and where the two optical paths are reflectively terminated. Element 17: where the optical paths are reflectively terminated with faraday rotator mirrors. Element 18: including splitting the optical interferometry signals with one or more splitters that each distributes one of the optical interferometry signals to two of the balanced photo-detectors. Element 19: including generating a local oscillator output signal with a local oscillator, generating a shifted signal with a frequency shifter which receives the source signal and the local oscillator output signal, receiving the frequency shifted signal with a fiberoptic coupler, and receiving the local oscillator output signal and the electrical difference signals from one of the balanced photo-detector with one or more mixers, each of the one or more mixers generating a mixer output signal. Element 20: where the optical frequency shifter includes an optical phase shifter driven by a sawtooth or linear ramp function. Element 21: where the optical phase shifter is an acousto-optic modulator. Element 22: further including filtering the mixer output signal with one or more low-pass filters, and generating a filtered output signal from each of the one or more low-pass filters. Element 23: where the circuitry further includes digitizing the electrical difference signals with at least one analog to digital converter, and processing the digitized electrical difference signals with a processing unit to obtain the interferometric phase signal.

What is claimed is:

1. An interferometric system with high-fidelity optical phase demodulation, comprising:
    a receiver having:
        a fiberoptic coupler that produces optical interferometry signals having mutual phase separations of 120°;
        balanced photo-detectors that each produce an electrical difference signal based on a respective pair of said optical interferometry signals;
        circuitry that converts the electrical difference signals into measurements of an interferometric phase; and
    a source that transmits at least one light pulse along a distributed sensing fiber, wherein the circuitry windows said measurements based on a time delay after each pulse to associate said measurements with a position on the distributed sensing fiber.

2. The system of claim 1, wherein the distributed sensing fiber couples one or more return signals to the receiver, and wherein the receiver splits the one or more return signals across two optical paths having a propagation delay difference to enable the fiberoptic coupler to produce said optical interferometry signals.

3. The system of claim 2, further comprising a first circulator that couples said at least one light pulse from the source to the distributed sensing fiber, and further couples at least one of the one or more return signals to the receiver.

4. The system of claim 2, wherein the fiberoptic coupler splits at least one of the one or more return signals across the two optical paths, and wherein the two optical paths are reflectively terminated.

5. The system of claim 4, wherein said optical paths are reflectively terminated with faraday rotator mirrors.

6. The system of claim 4, wherein the receiver further comprises a second circulator that couples the one or more return signals to the fiberoptic coupler, and that further couples one of said optical interferometry signals to at least one of the balanced photo-detectors.

7. The system of claim 1, wherein the receiver further comprises one or more splitters that each distribute one of the optical interferometry signals to two of said balanced photo-detectors.

8. The system of claim 7, wherein the optical interferometry signals comprise three optical interferometry signals, and wherein the balanced photo-detectors comprise three balanced photo-detectors that each produce an electrical difference signal between every pair of said three optical interferometry signals.

9. The system of claim 7, further comprising:
    a circulator that couples said at least one light pulse from the source to the distributed sensing fiber, and further couples a return signal to the receiver;
    an optical frequency shifter that couples the source to the fiberoptic coupler;
    a local oscillator which generates a local oscillator output signal; and
    one or more frequency mixers, each mixer configured to receive the local oscillator output signal and the electrical difference signals from one of the balanced photo-detectors, and thereby generate a mixer output signal.

10. The system of claim 9, wherein the optical frequency shifter is an acousto-optic modulator.

11. The system of claim 9, wherein the optical frequency shifter comprises an optical phase shifter driven by a sawtooth or linear ramp function.

12. The system of claim 9, further comprising one or more low-pass filters, each low-pass filter coupled to one of the one or more frequency mixers and configured to generate a filtered output signal.

13. The system of claim 1, wherein the circuitry comprises:
    at least one analog to digital converter that digitizes said electrical difference signals; and
    a processing unit that combines digitized electrical difference signals to obtain an interferometric phase signal.

14. A method of measuring interferometric phase with high-fidelity optical phase demodulation, comprising:
    transmitting at least one light pulse along a distributed sensing fiber with a source;
    producing optical interferometry signals having mutual phase separations of 120° with a fiberoptic coupler;
    performing balanced detection on each of multiple pairs of said optical interferometry signals to obtain corresponding electrical difference signals;
    converting the electrical difference signals into measurements of an interferometric phase with circuitry, each of said measurements being associated with a corresponding position along the distributed sensing fiber; and
    windowing said measurements with the circuitry based on a time delay after each pulse to associate said measurements with a position on the distributed sensing fiber.

15. The method of claim 14, wherein the distributed sensing fiber couples one or more return signals to a receiver, the method further comprising splitting the one or more return signals across two optical paths with the receiver, wherein the two optical paths have a propagation delay difference to enable the fiberoptic coupler to produce said optical interferometry signals.

16. The method of claim 15, wherein the fiberoptic coupler splits the one or more return signals across the two optical paths, and wherein the two optical paths are reflectively terminated.

17. The method of claim 16, wherein said optical paths are reflectively terminated with faraday rotator mirrors.

18. The method of claim 14, further comprising splitting the optical interferometry signals with one or more splitters that each distributes one of the optical interferometry signals to two balanced photo-detectors.

19. The method of claim 18, further comprising:
    generating a local oscillator output signal with a local oscillator;

generating a frequency shifted signal with an optical frequency shifter which receives a signal from the source and the local oscillator output signal;
receiving the shifted signal with a fiberoptic coupler; and
receiving the local oscillator output signal and the electrical difference signals from one of the two balanced photo-detectors with one or more frequency mixers, each of the one or more frequency mixers generating a mixer output signal.

20. The method of claim 19, wherein the optical frequency shifter is an acousto-optic modulator.

21. The method of claim 19, wherein the optical frequency shifter comprises an optical phase shifter driven by a sawtooth or linear ramp function.

22. The method of claim 19, further comprising:
filtering the mixer output signal with one or more low-pass filters; and
generating a filtered output signal from each of the one or more low-pass filters.

23. The method of claim 14, wherein the circuitry further comprises:
digitizing said electrical difference signals with at least one analog to digital converter; and
processing the digitized electrical difference signals with a processing unit to obtain an interferometric phase signal.

* * * * *